April 25, 1950 P. JACOBSEN 2,505,404
MACHINE FOR CORRUGATING CARDBOARD
Filed March 21, 1947 2 Sheets-Sheet 1
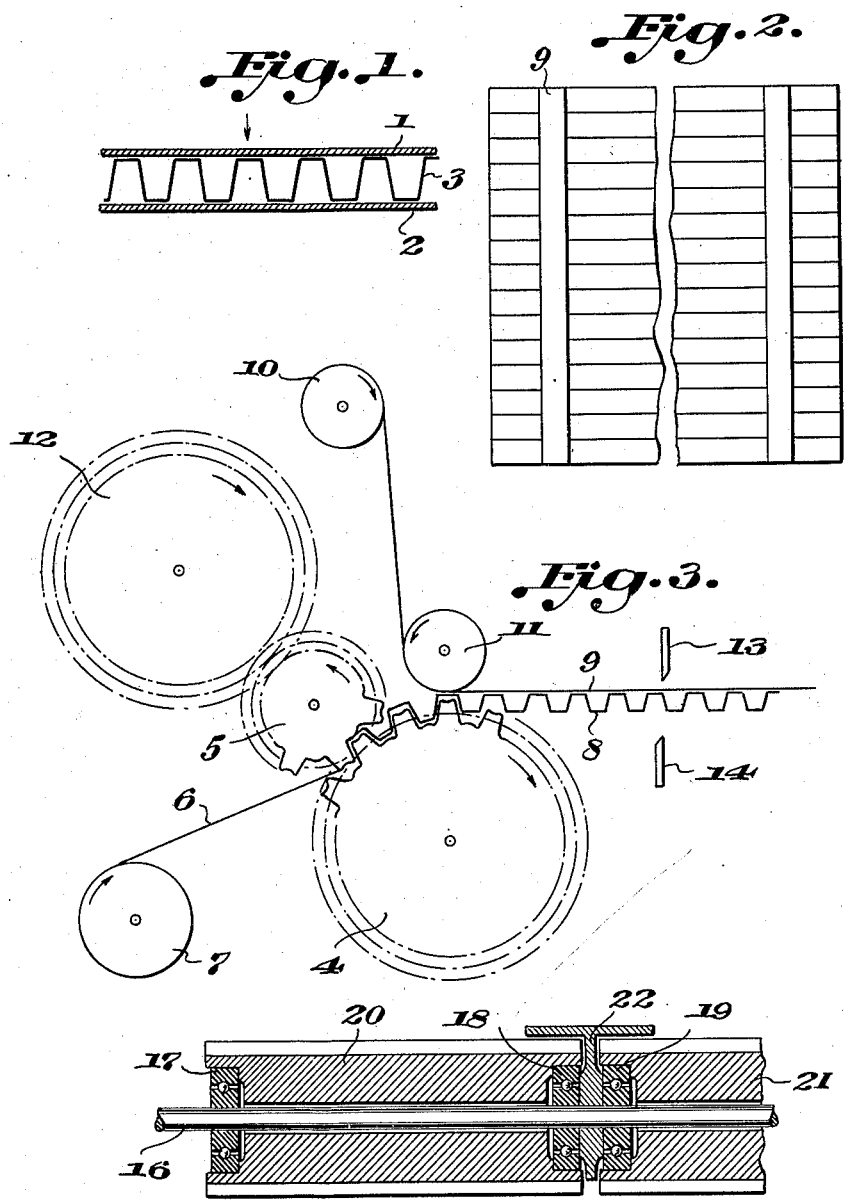
INVENTOR
P. Jacobsen,
BY Wenderoth, Lind & Ponack
ATTORNEYS April 25, 1950 P. JACOBSEN 2,505,404
MACHINE FOR CORRUGATING CARDBOARD
Filed March 21, 1947 2 Sheets-Sheet 2
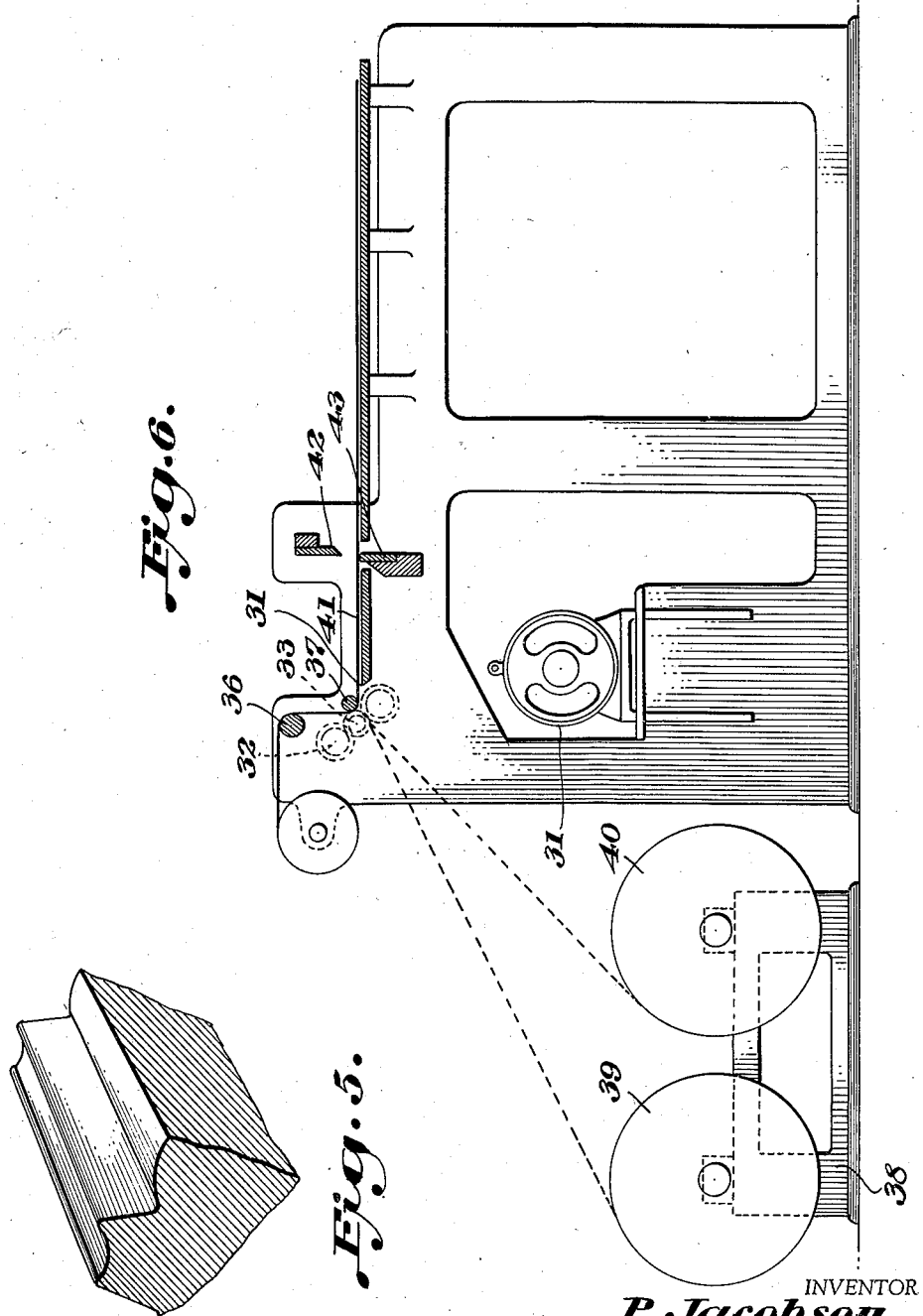
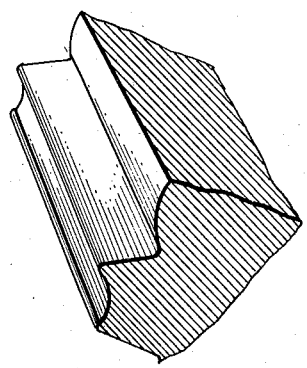
INVENTOR
P. Jacobsen,
BY Wenderoth, Lind & Ponack
ATTORNEYS Patented Apr. 25, 1950

2,505,404

UNITED STATES PATENT OFFICE 2,505,404

MACHINE FOR CORRUGATING CARDBOARD

Peter Jacobsen, Copenhagen, Denmark, assignor to Dry Corrugating Method v/akselbo, Berbom og Drostholm, Copenhagen, Denmark Application March 21, 1947, Serial No. 736,370
In Denmark January 14, 1944

Section 1, Public Law 690, August 8, 1946
Patent expires January 14, 1964

12 Claims. (Cl. 154—31)

The invention relates in part to a method in the production of corrugated cardboard with a core the corrugations of which are transverse to the direction of production preferably in cross-section have a sharp-edged shape, and in part the corrugated cardboard produced by the method. Furthermore the invention relates to a machine for carrying out the method and with two toothed, co-operating rollers, the outer tooth surfaces of which are preferably concave.

The purpose of the invention is to state a method and a machine which simplify the production. A further purpose is to increase the rate of production and in certain cases also to make it possible to reduce the space required for the production of corrugated cardboard without the plant getting complicated and expensive.

The method in accordance with the invention is characteristic in that on the core there are after the formation of the corrugation on at least one side glued one or more preferably narrow paper strips which run transversely to the direction of the corrugations and which, contingently forming the sole covering, serve for preserving the shape of the core.

This product composed of core and glued-on strips may in accordance with the invention exist as an independent unit without being deformed, the strips substituting the reinforcing covering. Apart from the fact that in itself this product offers advantages because it can be transported e. g. in rolls without the corrugations being deformed, it also possesses the advantage that it makes possible the use of an especially simple method in the production of corrugated cardboard which is covered on one or on both sides. By this method the core is cut into pieces, each of which is carried off, preferably in a direction at right angles to the direction of production of the core and on one or both sides is made to adhere to a piece of covering corresponding to the core by means of a binding agent, while at the same time a pile of corrugated cardboard is formed by the coverings and the core pieces.

Hereby is achieved that the machine may be made short in the direction of production because it is not necessary to finish the production of the corrugated cardboard in the machine proper, viz. so that also the drying of the binding agent is finished before the corrugated cardboard leaves the machine. In conformity herewith there is an embodiment of the method in accordance with the invention on top of each pile placed a pressure plate, e. g. of plywood, after which the pile is led to a drying place for finishing its drying. Instead of alternating layers of cores and coverings there may be used solely cores with their adhering strips preferably so that the cores are placed with their corrugations at right angles to each other. Two machines at right angles to each other may supply the pieces of core in a common pile. The rigid material produced hereby may advantageously be used as insulating material.

It is furthermore characteristic of the method in accordance with the invention that a binding agent may be used which requires such a time for drying that the drying proper does not take place until the pressure plate has been mounted on the pile. Hereby one gets more freedom of choice with regard to binding agent and may e. g. without special consideration of the time required for the drying choose a moisture-stable binding agent.

The machine in accordance with the invention is characterized in that the teeth on the rollers, the diameters of which are so adapted that substantially only one tooth on the roller is at any time in engagement with the teeth on the other roller, are sharp-edged in such a way that their cross-section shows a projecting rounding of a very small diameter, while in the clearances between the teeth there are at the roots of the teeth shaped corresponding rounded depressions. The other roller may serve as back-pressure or counter roller for a roller for applying strips by gluing on to the core material. By this construction is achieved in part that the machine works without rupturing the paper, and in part that the paper is impressed and thereby softened in the places where it is curved strongly so that the strips glued on do not come off on account of resilience. Thus neither heat nor steam is required for producing the permanent deformation. By one of the production rollers serving as counter-roller during the gluing of the strips on the core material, transmission of the latter to another member is avoided, e. g. to another roller or a chain, and thereby the difficulties deriving therefrom.

The special roller form may be used in connection with machines for the production of single-cover or double-cover corrugated cardboard, the coverings being in the usual way applied to the core and then themselves forming or substituting the strips.

In an embodiment of the machine in accordance with the invention it is provided with a transport member which preferably in a direction at right angles to the direction of production of the core conveys or sweeps the core pieces which have been cut into suitable lengths by means of a cutter actuated by the machine into a pile, and with transport members which supply coverings cut to the same measure between the core pieces with a binding agent as intermediate layer. The machine may furthermore in accordance with the invention be provided with transport members, e. g. conveyor belts, which lead the finished piles to a drying place.

In the case of comparatively large widths of the corrugated cardboard to be produced it may be difficult to produce the roller of the smallest diameter so that it is sufficiently large, and in order to avoid a downward bending, which may entail that the corrugations in the core do not become sharp-edged, one may in accordance with the invention give one or both of the rollers bearing supports between the two usual end supports. These bearing supports may be adjustable in a direction against the co-operating roller.

In an especially expedient embodiment of the machine in accordance with the invention is at least one roller divided into several hollow parts which are carried on bearings by a continuous shaft supported at its ends, while the intermediate supports are inserted between mutually adjacent parts of the roller.

The invention will in the following be further described with references to the purely diagrammatical drawing where Fig. 1 shows a section through a piece of corrugated cardboard known per se of a shape that is sharp-edged in cross-section and with two coverings, Fig. 2 a piece of core material produced in accordance with the invention with strips applied but without the usual covering, Fig. 3 the most important parts of a machine in accordance with the invention, Fig. 4 a section through a roller with intermediate supports for a machine in accordance with the invention, Fig. 5 a section of a toothed roller according to the invention, and Fig. 6 a machine for carrying out the method according to the invention.

The section in Fig. 1 runs parallel to the direction of production for a piece of corrugated cardboard in accordance with the invention. The corrugated cardboard has here two plain coverings 1 and 2 between which there is a corrugated core 3. It appears from the figure that the corrugations are sharp-edged of cross-section and that they consist of substantially rectilinear pieces. In the corrugated cardboard in accordance with the invention there is, however, along the edges on the crests of the corrugations an impression deriving from the projecting parts on the surfaces of the teeth, which will be further mentioned in the following.

In the core piece shown in Fig. 2 the corrugations are of rectangular cross-section, and as sole covering there are in accordance with the invention adhering paper strips 9.

Further details regarding the method and the machine in accordance with the invention will in the following be explained with references to Fig. 3. Two rollers 4 and 5 with sharp-edged tooth-sections are mounted in such a way that their teeth engage. A paper material 6 coming from a roll 7 is led in between the teeth. When the rollers 4 and 5 turn in the direction of the arrows, the paper material 6 is shaped so as to get the appearance indicated by 8, i. e. with sharp bends at the points of transition. For preserving this shape a covering is glued on, contingently only in the form of paper strips 9, see also Fig. 2, which are led along from a roll 10 over a guide roll 11. It appears from the figure that the roller 4 is used as back-pressure or counter roller for the roll 11, which is especially advantageous, as in part a simplified construction is achieved and in part damage to the finished core is avoided.

The strips 9 may be so called glue-strips provided with binding agent on one side and being, if necessary, moistened from a moistening roller, not shown, before being applied to the core. Strips without binding agents may, however, also be used, and they must then be supplied with glue from a special glue roller, not shown.

The teeth on the rollers 4 and 5 are sharp-edged, see Fig. 5, preferably so that the outer tooth surface is of a certain extension and is concave, whereby the edges of the teeth are made to function as bending edges around which the paper is bent sharply. By sharp edges should be understood that the cross-section of the teeth shows a projecting rounding of a very small diameter, so that the bending is effected without damage to the paper. The clearances between the teeth are at the roots of the teeth shaped with corresponding rounded depressions.

Dependent on the size of the machine one or both of the rollers 4 and 5 may be driven, and there may be another roller 12 the teeth of which engage with the teeth of the roller 5 and which may function as driving roller.

In the embodiment shown of the machine in accordance with the invention the roller 5 is of a considerably smaller diameter than the roller 4, and only one tooth on the small roller 5 is at any time in engagement with the teeth on the large roller 4. This means that the paper material 6 is not stretched during the shaping, so that the strength of the core is not weakened.

When the core leaves the rollers 4 and 5, the pieces of the paper which have been curved by their abutment against the concave tooth surface will try to straighten out on account of the resilience of the paper, and the transition parts between the crests and troughs of the corrugations will by a suitable proportioning of the teeth tend to get parallel. The said transition parts which on account of the tooth shape have been slightly curved, likewise substantially straighten out.

The finished core runs out on a table not shown and is cut off by means of a cutting-off mechanism 13, 14 into suitably long pieces. After the cutting-off of such a piece the latter is preferably in a direction at right angles to the plane of the drawing led or pushed to the side, and a binding agent is applied, e. g. from one or more glue rollers not shown, on one or on both sides of the core, viz. on the outer sides of the crests of the corrugations. The reason why the said direction should be preferred is that the core has its greatest rigidity in that direction.

The core piece which has to be provided with binding agent is then led on, expediently down on to a truck upon which by mechanical means has been placed a piece of covering cardboard supplied from one or more rollers. On top of the core piece there is likewise by mechanical means placed a piece of covering cardboard to be glued on to the core piece besides another piece of covering cardboard to be glued on to the following core piece cut off in the meantime.

When the pile has reached a suitable height, the truck is run away, and another truck takes its place to receive another pile. As a termination on top of each finished pile a pressure plate is placed, e. g. of plywood. The pile can then without a truck be placed in a drying place where the binding agent dries, after which the corrugated cardboard is ready for use.

As already mentioned there may in accordance with the invention be used a comparatively slowly drying binding agent the length and working rate of the machine being independent of the rate at which the binding agent dries.

The roller 5 which has a small diameter will, if it is to have a comparatively large length, yield at the middle if supported by bearings only by the ends. In accordance with the invention it has proved possible to divide the roller into several pieces while applying supports between the individual pieces without the interruptions influencing the formation of the core. In Fig. 4 a section is shown through a fragment of such a roller. A continuous shaft 16 carries on ball bearings 17, 18, and 19 the roller piece 20 and 21. The continuous shaft 16 is carried by an intermediate supporting bearing 22, which is narrow in the place where it passes out through the surface of the rollers. As mentioned before it has proved that the short interruption arising hereby in the roller teeth does not give rise to any irregularity in the core produced with such a roller.

In the construction indicated in Fig. 6 30 is the base of a corrugating cardboard machine having a frame supporting a driving motor 31, three toothed rollers 32, 33 and 34, of which the two last mentioned serves to produce the corrugated cardboard as already described in connection with Fig. 3, both roller 32 and 34 may be driven from the motor 31. A roll 35 is journalled in the frame of the machine and supports adhesive strips over two rollers 36 and 37, the latter of which presses against the teeth of the roller 34. The aggregate 35, 36, 37 may be duplicated or multiplied over the width of the machine thus permitting more adhesive, stabilizing strips to be furnished to the corrugated core. On a separate frame 38 is journalled two rolls 39 and 40, both carrying a supply of paper to be corrugated, the one serving as a reserve when the other is empty, and must be substituted. A table 41 serves to receive the corrugated cardboard produced, and a cutter with two knives 42 and 43 are placed adjacent to the corrugating rollers. Means, not shown on the drawing, are mounted to sweep the cut pieces of cardboard out in a direction in right angles to the direction of production.

If the adhesive strips need to be moistened, the roller 36 may run with its lower end in a basin with water or glue.

In addition to the embodiments described the method and the machine in accordance with the invention may be carried out in other ways which may be easily imagined. It is for example not necessary that the core cut off is let out in a direction at right angles to the direction of production of the core; it may in the usual way after previous covering be dried quickly by heat, e. g. high-frequency heating, so that the corrugated cardboard leaves the machine in its finished state; the core pieces may be led alternately in different directions for the simultaneous formation of two or three piles. If a quickly drying binding agent is used, discharge in a certain direction, viz. at right angles to the direction of production must be preferred. The binding agent may be applied either to the core or to the coverings, and the application may be performed in any suitable way, e. g. by spraying. For the core cheap quality paper may be used which has not hitherto been regarded as applicable for that purpose.

The transport of the piles of corrugated cardboard to the drying room need not be performed by means of trucks which may run on rails, but may also be effected by means of belt conveyors which can take either a whole pile or part of the latter. In the latter case a piling may take place in the drying room.

If both rollers are of small diameters, they may both be carried by intermediate supporting bearings, and the clearances between the roller pieces in one roller are then expediently displaced in relation to the clearances in the other. Both of the rollers may be supported by back-pressure or driving rollers. The tooth shape may be of any suitable kind, i. e. for example triangular of cross-section. The machine may, if it be desired, be arranged for in a way by applying the coverings immediately after the production of the core.

I claim:

1. A machine for producing corrugated cardboard, comprising two toothed co-operating rollers, the diameters of which are so adapted that not more than three teeth on one of the rollers at any time are in cooperation with the teeth on the other roller, the said teeth having an outwards pointing protrusion running along each edge of the surface of the tooth parallel to the axis of the roller the protrusion having in a section normal to the said axis the form of a rounding with a very small diameter, said rollers having correspondingly rounded depressions in the clearances at the roots of the teeth and running parallel to the axis of the rollers.

2. A machine as claimed in claim 1, wherein the outer tooth surfaces are concave.

3. Machine as claimed in claim 1, wherein one of the toothed rollers has a large diameter compared to that of the other roller.

4. A machine for producing corrugated cardboard, comprising two toothed cooperating rollers, the diameters of which are so adapted that not more than three teeth on one of the rollers at any time are in cooperation with the teeth on the other roller, the said teeth having an outwards pointing protrusion running along each edge of the surface of the tooth parallel to the axis of the roller the protrusion having in a section normal to the said axis the form of a rounding with a very small diameter, said rollers having correspondingly rounded depressions in the clearances at the roots of the teeth and running parallel to the axis of the rollers, and at least one supply roll for supplying stabilizing strips to the corrugated core produced.

5. A machine as claimed in claim 4 wherein the supply rolls carries a supply of strips.

6. A machine as claimed in claim 4, wherein the supply roll carries a supply of covering material.

7. A machine as claimed in claim 4 comprising two supply rolls for upper and lower coverings respectively.

8. A machine as claimed in claim 4 wherein one of the rollers serves as counter roller for a feeding roller for the application of stabilizing strips.

9. A machine as claimed in claim 4 wherein at least one of the rollers has bearing supports situated between the two usual end-supports.

10. A machine as claimed in claim 4 wherein at least one roller is divided into several hollow parts, which on bearings are carried by a continuous shaft supported at the ends, while the intermediate supports are inserted between mutually adjacent parts of the roller.

11. A machine for producing corrugated cardboard, comprising two toothed cooperating rollers, the diameters of which are so adapted that not more than three teeth on one of the rollers at any time are in cooperation with the teeth on the other roller, the said teeth having an outwards pointing protrusion running along each edge of the surface of the tooth parallel to the axis of the roller the protrusion having in a section normal to the said axis the form of a rounding with a very small diameter, said rollers having correspondingly rounded depressions in the clearances at the roots of the teeth and running parallel to the axis of the rollers at least one supply roll for supplying stabilizing strips to the corrugated core produced, and a transport member sweeping the corrugated material into a pile, in a direction transversal to the direction of production.

12. A machine as claimed in claim 11, comprising conveying means for feeding coverings upon the corrugated pieces of core and transporting means for feeding a glue as intermediate layer between the core and the coverings.

PETER JACOBSEN.

REFERENCES CITED

The following references are of record in the file of this patent:

UNITED STATES PATENTS

| Number | Name | Date |
|---|---|---|
| Re. 20,034 | Ives | July 14, 1936 |
| 1,100,064 | Ferres | June 16, 1914 |
| 1,199,508 | Swift | Sept. 26, 1916 |
| 1,944,280 | Snyder | Jan. 23, 1934 |
| 2,041,356 | Kraft | May 19, 1936 |
| 2,051,025 | Bauer | Aug. 18, 1936 |
| 2,289,909 | Greenwood | July 14, 1942 |
| 2,301,695 | Gillian | Nov. 10, 1942 |

FOREIGN PATENTS

| Number | Country | Date |
|---|---|---|
| 41,328 | France | Dec. 3, 1932 |